United States Patent
Doerr et al.

(10) Patent No.: US 10,884,397 B2
(45) Date of Patent: Jan. 5, 2021

(54) METHOD AND SYSTEM FOR DEVISING AN OPTIMUM CONTROL POLICY

(71) Applicants: Robert Bosch GmbH, Stuttgart (DE); Max-Planck-Gesellschaft zur Förderung der Wissenschaften e.V., Munich (DE)

(72) Inventors: Andreas Doerr, Stuttgart (DE); Sebastian Trimpe, Tübingen (DE); Duy Nguyen-Tuong, Calw (DE)

(73) Assignees: Robert Bosch GmbH, Stuttgart (DE); Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 15/944,597

(22) Filed: Apr. 3, 2018

(65) Prior Publication Data

US 2019/0258228 A1 Aug. 22, 2019

(30) Foreign Application Priority Data

Feb. 16, 2018 (DE) .................. 10 2018 202 431

(51) Int. Cl.
*G05B 19/4155* (2006.01)
(52) U.S. Cl.
CPC ............ *G05B 19/4155* (2013.01); *G05B 2219/42018* (2013.01)
(58) Field of Classification Search
None
See application file for complete search history.

(56) References Cited

U.S. PATENT DOCUMENTS

| | | | |
|---|---|---|---|
| 2015/0217449 A1* | 8/2015 | Meier | B25J 9/1602 700/257 |
| 2016/0202670 A1* | 7/2016 | Ansari | G05B 13/026 700/45 |
| 2018/0012137 A1* | 1/2018 | Wright | G05B 13/0265 |

OTHER PUBLICATIONS

Calinon et al., "On Learning Representing, and Generalizing a Task in a Humanoid Robot", IEEE 2007 (Year: 2007).*
Dwight et al., "Effect of Approximations of the Discrete Adjoint on Gradient-Based Optimization", AIAA Journal, Dec. 2006 (Year: 2006).*

(Continued)

*Primary Examiner* — Carlos R Ortiz Rodriguez
(74) *Attorney, Agent, or Firm* — Maginot, Moore & Beck LLP (57) ABSTRACT

A method for devising an optimum control policy of a controller for controlling a system includes optimizing at least one parameter that characterizes the control policy. A Gaussian process model is used to model expected dynamics of the system. The optimization optimizes a cost function which depends on the control policy and the Gaussian process model with respect to the at least one parameter. The optimization is carried out by evaluating at least one gradient of the cost function with respect to the at least one parameter. For an evaluation of the cost function a temporal evolution of a state of the system is computed using the control policy and the Gaussian process model. The cost function depends on an evaluation of an expectation value of a cost function under a probability density of an augmented state at time steps.

12 Claims, 6 Drawing Sheets a)

b)

(56) References Cited

OTHER PUBLICATIONS

Doerr, Andreas et al., Model-Based Policy Search for Automatic Tuning of Multivariate PID Controllers, Presentation at ICRA 2017, May 29, 2017, Singapore (7 pages).
Doerr, Andreas et al., Model-Based Policy Search for Automatic Tuning of Multivariate PID Controllers, Publication 2017 IEEE International Conference on Robotics and Automation (ICRA), May 29, 2017, pp. 5295-5301.
Doerr, Andreas et al., Model-Based Policy Search for Automatic Tuning of Multivariate PID Controllers, arXiv—preprint of article, Mar. 8, 2017 (7 pages).

* cited by examiner

METHOD AND SYSTEM FOR DEVISING AN OPTIMUM CONTROL POLICY

This application claims priority under 35 U.S.C. § 119 to patent application no. DE 10 2018 202 431.6, filed on Feb. 16, 2018 in Germany, the disclosure of which is incorporated herein by reference in its entirety.

BACKGROUND

PID control architectures are widely used in industrial applications. Despite their low number of open parameters, tuning multiple, coupled PID controllers can become tedious in practice.

The publication "PILCO: A Model-Based and Data-Efficient Approach to Policy Search", Marc Peter Deisenroth, Carl Edward Rasmussen, 2011, which can be accessed at http://www.icml-2011.org/papers/323_icmlpaper.pdf discloses a model-based policy search method.

SUMMARY

The method with the features disclosed herein has the advantage that it renders PID tuning possible as the solution of a finite horizon optimal control problem is possible without further a priori knowledge.

Proportional, Integral and Derivative (PID) control structures are still a widely used control tool in industrial applications, in particular in the process industry, but also in automotive applications and in low-level control in robotics. The large share of PID controlled applications is mainly due to the past record of success, the wide availability, and the simplicity in use of this technique. Even in multivariable systems, PID controllers can be employed.

Exploring the mathematics behind the disclosure, it is possible to consider discrete time dynamic systems of the form $$x_{t+1} = f(x_t, u_t) + \in_t \quad (1)$$

with continuously valued state $x_t \in \mathbb{R}^D$ as well as continuously valued input $u_t \in \mathbb{R}^F$. The system dynamics f is not known a priori. One may assume a fully measurable state, which is corrupted by zero-mean independent and identically distributed (i.i.d.) Gaussian noise, i.e $\in_t \sim \mathcal{N}(0, \Sigma_\in)$.

One specific reinforcement learning formulation aims at minimizing the expected cost-to-go given by $$J = \Sigma_{t=0}^T \mathbb{E}_{[c(x_t, u_t; t)]} x_0 \sim \mathcal{N}(\mu_0, \Sigma_0) \quad (2)$$

where an immediate, possibly time dependent cost $c(x_t, u_t; t)$ penalizes undesired system behavior. Policy search methods optimize the expected cost-to-go J by selecting the best out of a range of policies $u_t = \pi(x_t; \theta)$ parametrized by $\theta$. A model $\hat{f}$ of the system dynamics f is utilized to predict the system behavior and to optimize the policy.

In a first aspect, the disclosure therefore relates to a method for devising an optimum control policy $\pi$ of a controller, especially a PID controller, for controlling a (physical) system, said method comprising optimizing at least one parameter $\theta$ that characterizes said control policy $\pi$, wherein a Gaussian process model $\hat{f}$ is used to model expected dynamics of the system, if the system is acted upon by said PID controller, wherein said optimization optimizes a cost function J which depends on said control policy $\pi$ and said Gaussian process model $\hat{f}$ with respect to said at least one parameter $\theta$, wherein said optimization is carried out by evaluating at least one gradient of said cost function J with respect to said at least one parameter $\theta$, wherein for an evaluation of said cost function J a temporal evolution of a state $x_t$ of the system is computed using said control policy $\pi$ and said Gaussian process model, wherein said cost function J depends on an evaluation of an expectation value of a cost function c under a probability density of an augmented state $z_t$ at predefinable time steps t.

The control output of a scalar PID controller is given by $$u_t = K_p e_t + K_i \int_0^t e_\tau d\tau + K_d \dot{e}_t \quad (3)$$

$$e_t = x_{des,t} - x_t \quad (4)$$

The current desired state $x_{des,t}$ can be either a constant set-point or a time-variable goal trajectory. A PID controller is agnostic to the system dynamics and depends only on the system's error. Each controller is parametrized by its proportional, integral and derivative gain $\theta_{PID} = (K_p, K_i, K_d)$. Of course, some of these gains may be set fixed to zero, yielding e.g. a PD controller in the case of $K_I = 0$.

A general PID control structure C(s) for MIMO (multi input multi output) processes can be described in transfer function notation by a D×F transfer function matrix $$C(s) = \begin{bmatrix} c_{11}(s) & \cdots & c_{1D}(s) \\ \vdots & \ddots & \vdots \\ c_{F1}(s) & \cdots & c_{FD}(s) \end{bmatrix} \quad (5)$$

where s denotes the complex Laplace variable and $c_{ij}(s)$ are of PID type. The multivariate error is given by $e_t = x_{des,t} - x_t \in \mathbb{R}^D$ such that the multivariate input becomes $u(s) = C(s)e(s)$.

Figure 1:
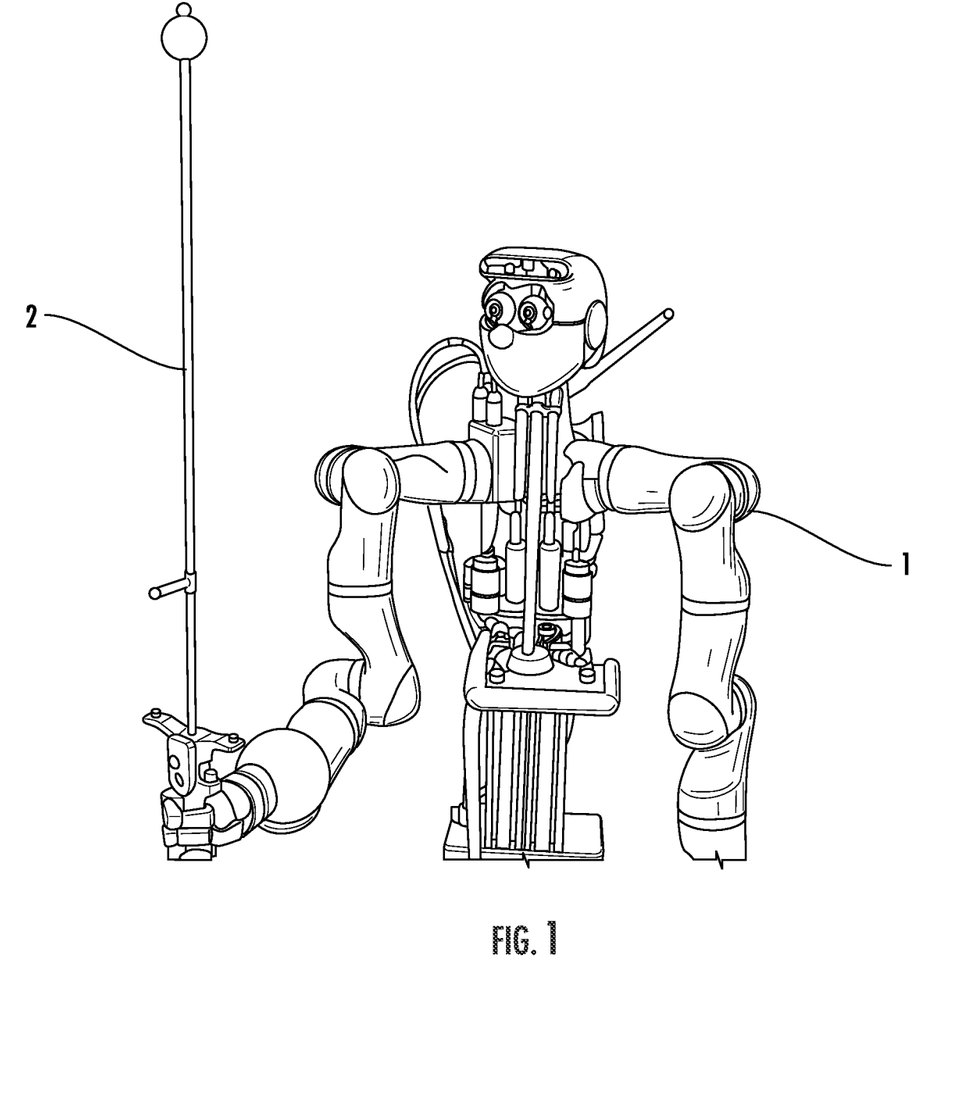
FIG. 1 is an illustration of a humanoid robot trained with a system according to the disclosure.

FIG. 1 shows a humanoid robot 1 balancing an inverted pendulum 2. Using the disclosure, coupled PID and PD controllers were successfully trained to stabilize the pole in the central, upright position without requiring a priori system knowledge.

Figure 2:
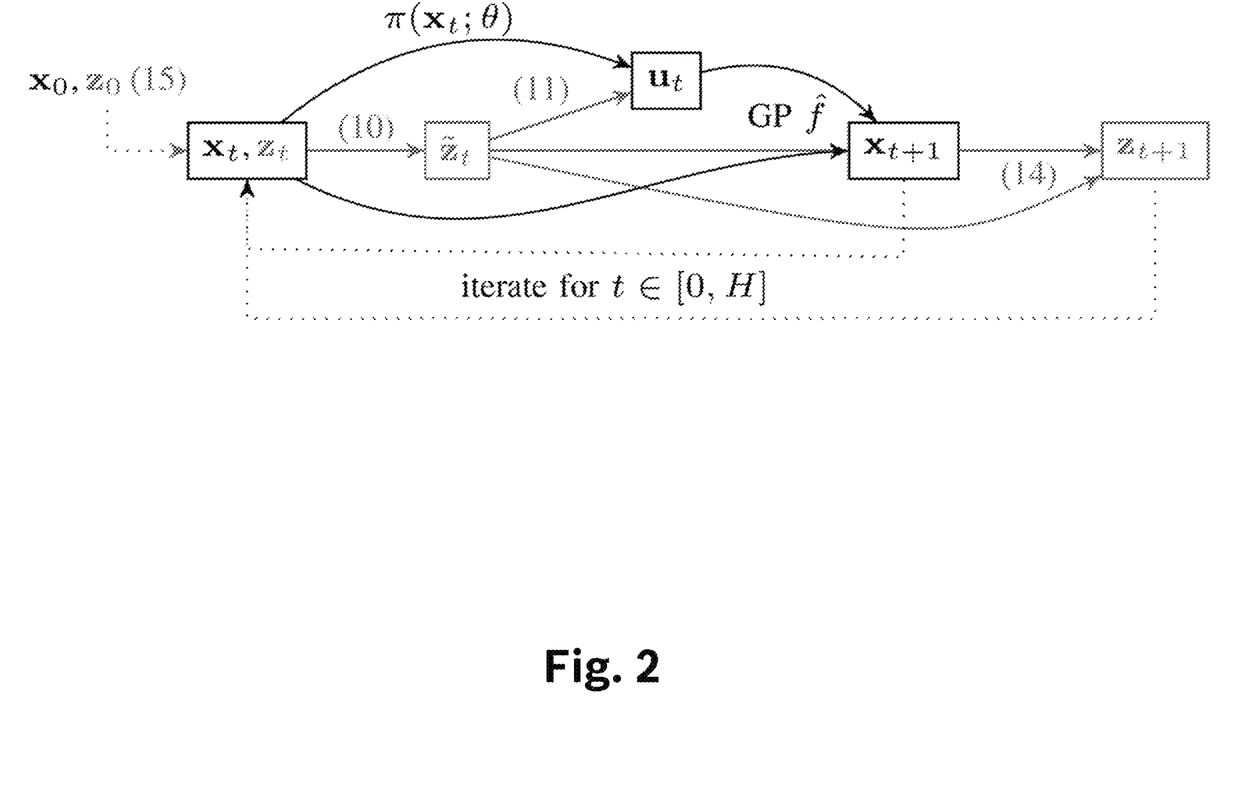
FIG. 2 is a schematic illustration of the mathematics behind the method according to an aspect of the disclosure.

We present a sequence of state augmentations such that any multivariable PID controller as given by equation (5) can be represented as a parametrized static state feedback law. A visualization of the state augmentation integrated into the one-step-ahead prediction is shown in FIG. 2, in comparison with the standard PILCO setting. All lines linking the blocks $\tilde{z}_t$, $z_{t+1}$ are absent in the standard PILCO setting.

Given a Gaussian distributed initial state $x_0$ the resulting predicted states will remain Gaussian for the presented augmentations.

To obtain the required error states for each controller given by equation (3), it is possible to define an augmented system state $z_t$ that may also track of the error at the previous time step and the accumulated error, $$z_t := (x_t, e_{t-1}, \Delta T \Sigma_{\tau=0}^{t-1} e_\tau) \quad (6)$$

where $\Delta T$ is the system's sampling time.

For simplicity, vectors are denoted as tuples $(v_1, \ldots, v_n)$ where $v_i$ may be vectors themselves. The following augmentations can be made to obtain the necessary policy inputs:

The augmented state $z_t$ and/or the desired state $x_{des,t}$ (set-point or target trajectory) may be selected as independent Gaussian random variables, i.e.

$$\begin{bmatrix} z_t \\ x_{des,t} \end{bmatrix} = \mathcal{N}\left( \begin{bmatrix} \mu_z \\ \mu_{des,t} \end{bmatrix}, \begin{bmatrix} \Sigma_z & 0 \\ 0 & \Sigma_{des,t} \end{bmatrix} \right) \quad (7)$$

Drawing the desired state $x_{des,t}$ from a Gaussian distribution yields improved generalization to unseen targets.

The current error is a linear function of $z_t$ and $x_{des,t}$. The current error derivative and integrated error may conveniently be approximated by $$\dot{e} \approx \frac{e_t - e_{t-1}}{\Delta T} \tag{8}$$

$$\int_{\tau=0}^{t} e_\tau d\tau \approx \Delta T \sum_{\tau=0}^{t-1} e_\tau + \Delta T e_t. \tag{9}$$

Both approximations are linear transformations of the augmented state. The resulting augmented state distribution remains Gaussian as it is a linear transformation of a Gaussian random variable This aspect of the disclosure can readily be extended to incorporate a low-pass filtered error derivative. In this case, additional historic error states would be added to the state $z_t$ to provide the input for a low-pass Finite Impulse Response (FIR) filter. This reduces measurement noise in the derivative error.

A fully augmented state $\tilde{z}_t$ is then conveniently given by $$\tilde{z}_t := \left(z_t, x_{des,t}, e_t, \frac{e_t - e_{t-1}}{\Delta T}, \Delta T \sum_{\tau=0}^{t} e_\tau\right) \tag{10}$$

Based on the fully augmented state $\tilde{z}_t$, the PID control policy for multivariate controllers can be expressed as a static state feedback policy $$u_t = A_{PID}(\tilde{z}_t^{(3)}, \tilde{z}_t^{(5)}, \tilde{z}_t^{(4)}) \tag{11}$$

$$= A_{PID}\left(e_t, , \Delta T \sum_{\tau=0}^{t} e_\tau, \frac{e_t - e_{t-1}}{\Delta T}\right).$$

Figure 3:
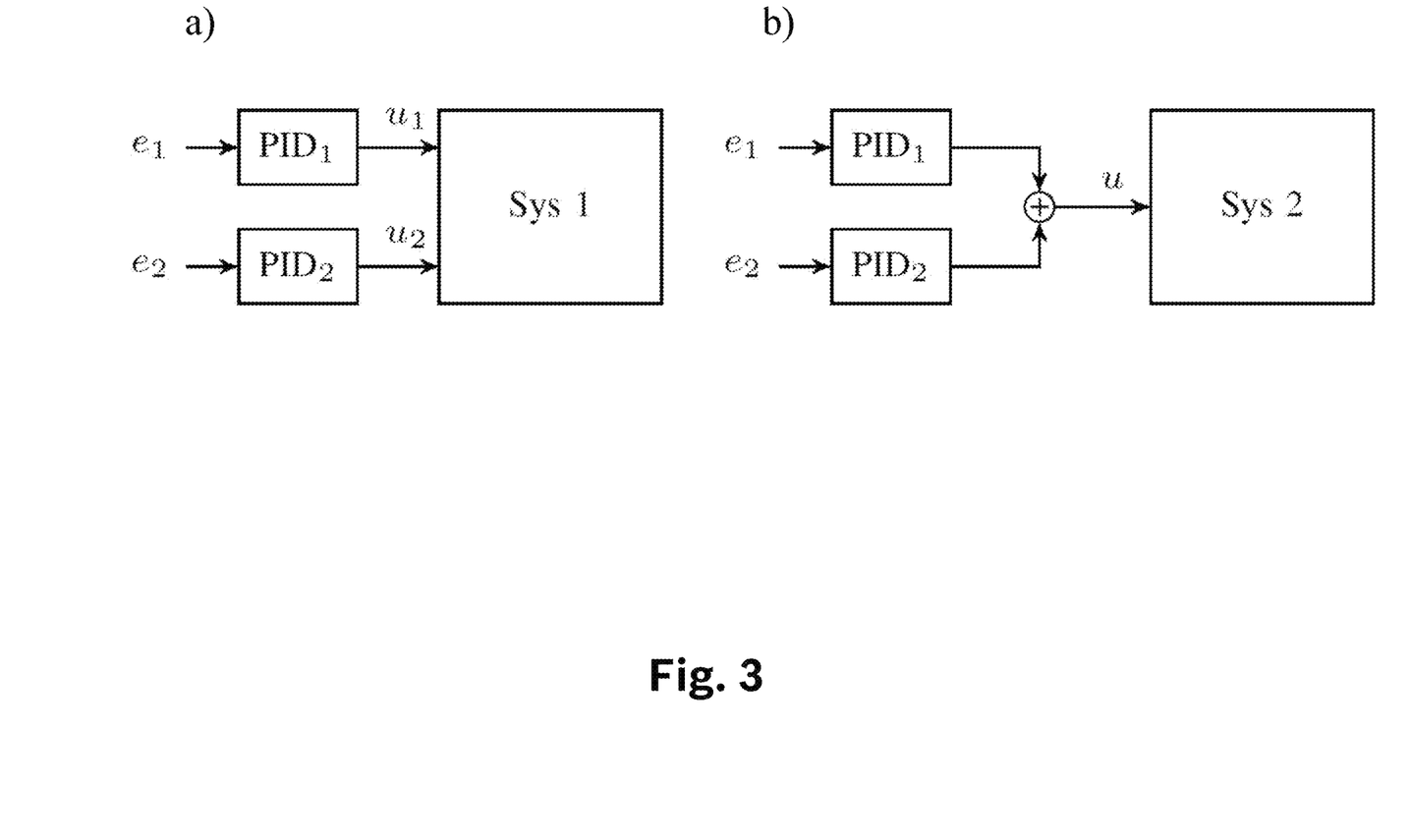
FIG. 3 is a block diagram depicting control structures of a controller to which the disclosure may be applied.

The specific structure of the multivariate PID control law is defined by the parameters in $A_{PID}$. For example, PID structures as shown in FIG. 3 may be represented by $$A_{a)} = \begin{bmatrix} K_{p,1} & 0 & K_{i,1} & 0 & K_{d,1} & 0 \\ 0 & K_{p,2} & 0 & K_{i,2} & 0 & K_{d,2} \end{bmatrix}, \tag{12}$$

$$A_{b)} = [K_{p,1} \; K_{p,2} \; K_{i,1} \; K_{i,2} \; K_{d,1} \; K_{d,2}]. \tag{13}$$

Given the Gaussian distributed augmented state and control input as derived above, the next augmented state may be computed using the GP dynamics model $\hat{f}$. It is possible to approximate the predictive distribution $p(x_{t+1})$ by a Gaussian distribution using exact moment matching. From the dynamics model output $x_{t+1}$ and the current error stored in the fully augmented state $z_t$, the next state may be obtained as $$z_{t+1} = (x_{t+1}, \tilde{z}_t^{(3)}, \tilde{z}_t^{(5)}) = (x_{t+1}, e_t, \Delta T \Sigma_{\tau=0}^{t} e_\tau) \tag{14}.$$

Iterating (6) to (14), a long-term prediction can be computer over a prediction horizon H as illustrated in FIG. 2. For the initial augmented state, one may conveniently define $$z_0 := (x_0, x_{des,0} - x_0, 0). \tag{15}$$

Given the presented augmentation and propagation steps, the expected cost gradient can be computed analytically such that the policy $\pi$ can be efficiently optimized using gradient-based methods.

The expected cost derivative may be obtained as $$\frac{dJ}{d\theta} = \sum_{t=1}^{H} \frac{d}{d\theta} \mathbb{E}_{z_t}[c(z_t)] = \sum_{t=1}^{H} \frac{d\varepsilon_t}{dp(z_t)} \frac{dp(z_t)}{d\theta}. \tag{16}$$

Here, we denoted $\varepsilon_t = \mathbb{E}_{z_t}[c(z_t)]$ and we write $dp(z_t)$ to denote the sufficient statistics derivatives $d\mu_t$ and $d\Sigma_t$ of a Gaussian random variable $p(z_t) \sim \mathcal{N}(\mu_t, \Sigma_t)$. The gradient of the immediate loss with respect to the augmented state distribution, $d\varepsilon_t/dp(z_t)$ is readily available for cost functions like quadratic or saturated exponential terms and Gaussian input distributions.

The gradient for each predicted augmented state in the long-term rollout may be obtained by applying the chain rule to (14) resulting in $$\frac{dp(z_{t+1})}{d\theta} = \frac{\partial p(z_{t+1})}{\partial p(\tilde{z}_t)} \frac{dp(\tilde{z}_t)}{d\theta} + \frac{\partial p(z_{t+1})}{\partial p(x_{t+1})} \frac{dp(x_{t+1})}{d\theta}. \tag{17}$$

The derivatives $$\frac{\partial p(z_{t+1})}{\partial p(\tilde{z}_t)} \text{ and } \frac{\partial p(z_{t+1})}{\partial p(x_{t+1})}$$

may be computed for the linear transformation in equation (14) according to the general rules for linear transformations on Gaussian random variables.

The gradient of the dynamics model output $x_{t+1}$ is given by $$\frac{dp(x_{t+1})}{d\theta} = \frac{\partial p(x_{t+1})}{\partial p(\tilde{z}_t)} \frac{dp(\tilde{z}_t)}{d\theta} + \frac{\partial p(x_{t+1})}{\partial p(u_t)} \frac{dp(u_t)}{d\theta}. \tag{18}$$

Applying the chain rule for the policy output $p(u_t)$ yields $$\frac{dp(u_t)}{d\theta} = \frac{\partial p(u_t)}{\partial p(\tilde{z}_t)} \frac{dp(\tilde{z}_t)}{d\theta} + \frac{\partial p(u_t)}{\partial \theta}. \tag{19}$$

The derivatives $$\frac{\partial p(u_t)}{\partial p(\tilde{z}_t)} \text{ and } \frac{\partial p(u_t)}{\partial \theta}$$

are introduced by the linear control law given by equation (11) and can be computed according to the general rules for linear transformations on Gaussian random variables. The gradient of the fully augmented state $\tilde{z}_t$ is given by $$\frac{dp(\tilde{z}_t)}{d\theta} = \frac{dp(\tilde{z}_t)}{dp(z_t)} \frac{dp(z_t)}{d\theta}. \tag{20}$$

-continued $$\frac{dp(\tilde{z}_t)}{dp(z_t)}$$

may be computed for the linear transformation given by equation (10). Starting from an initial augmented state $z_0$ where $$\frac{dp(z_0)}{d\theta} = 0,$$

it is possible to obtain gradients for all augmented states $z_t$ with respect to the policy parameters $\theta$, $dp(z_t)/d\theta$ by iteratively applying equations (17) to (20) for all time steps t.

The disclosure is also directed to a computer program. The computer program product comprises computer-readable instructions stored on a non-transitory machine-readable medium that are executable by a computer having a processor for causing the processor to perform the operations listed herein.

BRIEF DESCRIPTION OF THE DRAWINGS

The objects, features and advantages of the disclosure will be apparent from the following detailed descriptions of the various aspects of the disclosure in conjunction with reference to the following drawings, where.

DETAILED DESCRIPTION

Figure 4:
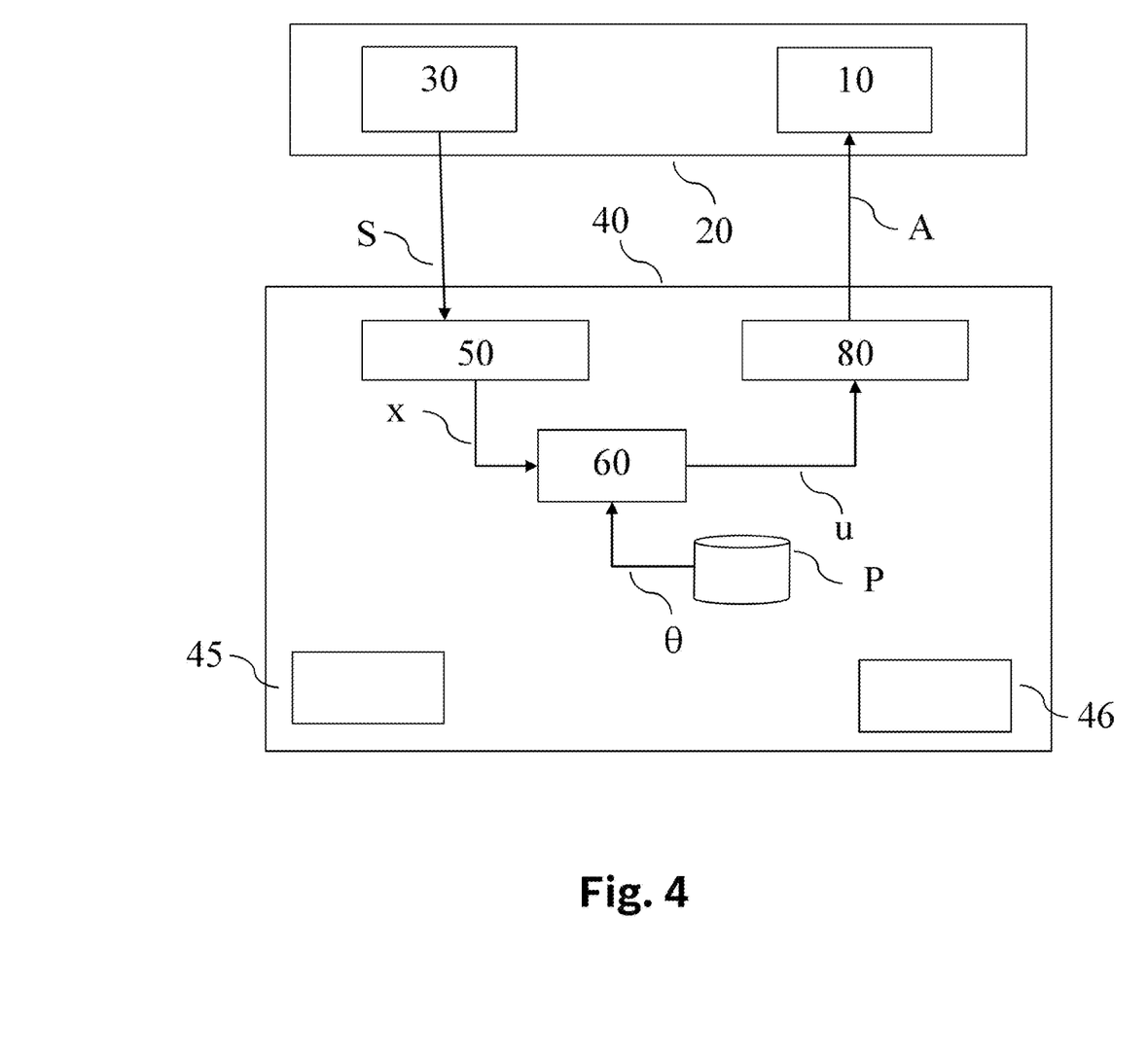
FIG. 4 is a block diagram depicting components of a system according to an aspect of the disclosure.

FIG. 4 shows a block diagram depicting components of a system according to an aspect of the disclosure. Shown is a control system 40, which receives sensor signals S from a sensor 30 via an input unit 50. The sensor senses a state of a physical system 10, e.g. a robot (like e.g. the humanoid robot 1 shown in FIG. 1, or an at least partially self-driving car), or more generally an actuator (like e.g. a throttle valve), in an environment 20. The input unit 50 transforms theses sensor signals S into a signal representing said state x. For example, the input unit 50 may copy the sensor signal S into a predefined signal format. If the sensor signal S is in a suitable format, the input unit 50 may be omitted altogether.

This signal representing state x is then passed on to a controller 60, which may, for example, be given by a PID controller. The controller is parameterized by parameters $\theta$, which the controller 60 may receive from a parameter storage P. The controller 60 computes a signal representing an input signal u, e.g. via equation (11). This signal is then passed on to an output unit 80, which transforms the signal representing the input signal u into an actuation signal A, which is passed on to the physical system 10, and causes said physical system 10 to act. Again, if the input signal u is in a suitable format, the output unit may be omitted altogether.

The controller 60 may be controlled by software which may be stored on a machine-readable storage medium 45 and executed by a processor 46. For example, said software may be configured to compute the input signal u using the control law given by equation (11).

Figure 5:
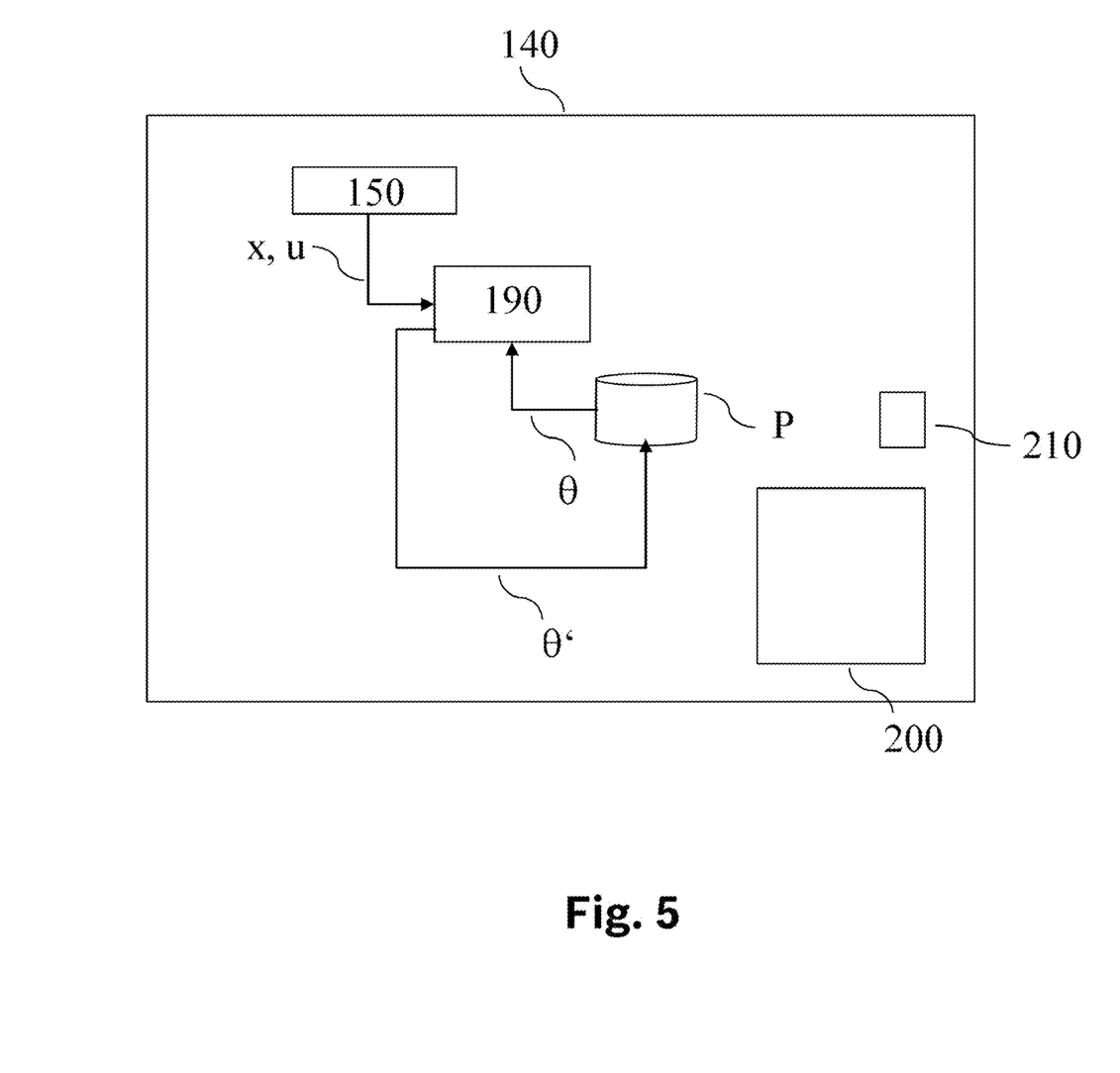
FIG. 5 is a block diagram depicting components of a system according to another aspect of the disclosure.

FIG. 5 shows a block diagram depicting a training system 140, which may be configured to train the control system 40. The training system 140 may comprise an input unit 150 for receiving signals representing an input signal u and a state signal x, which are then passed on to a block 190 which receives present parameters $\theta$ from parameter storage P and computes new parameters $\theta'$. These new parameters $\theta'$ are then passed on to parameter storage P to replace present parameters $\theta$. The block 190 may be operated by software which may be stored on a machine-readable storage medium 210 and executed by a processor 200. For example, block 190 may be configured to execute the steps of the method shown in FIG. 6.

Figure 6:
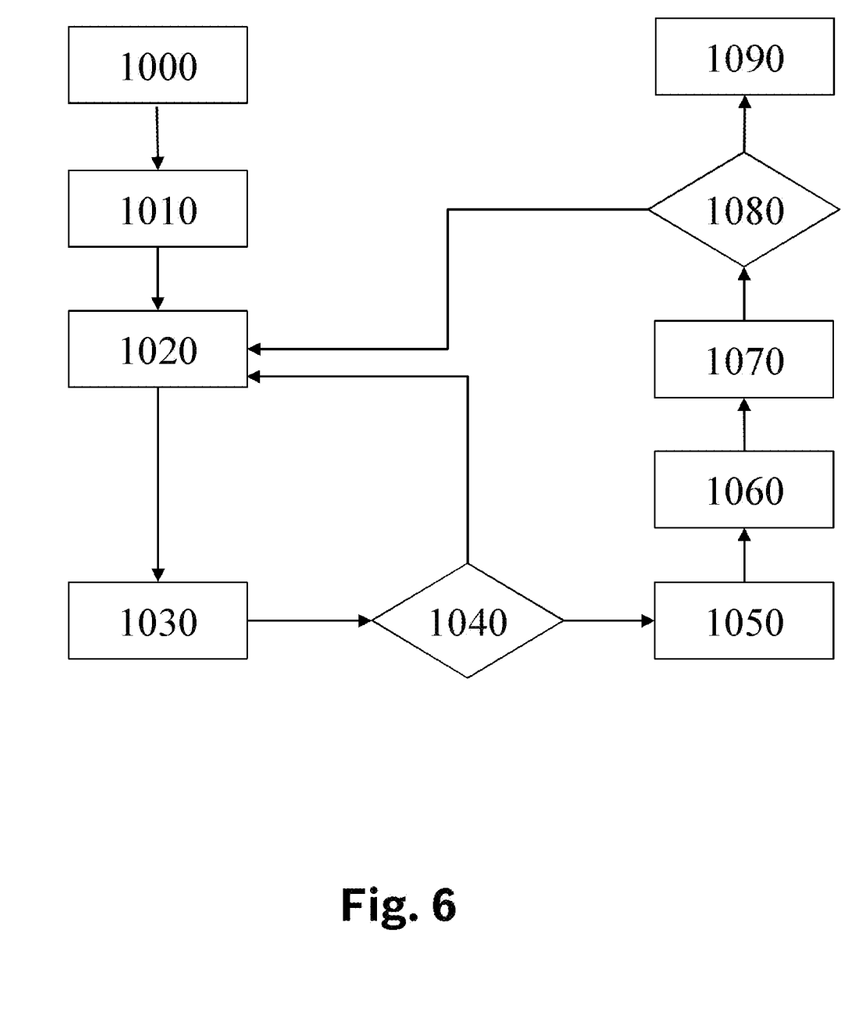
FIG. 6 is a flowchart diagram depicting the method according to one aspect of the disclosure.

FIG. 6 is a flowchart diagram depicting a method for devising optimum parameters $\theta$ for an optimum control policy $\pi$ of controller 60.

First (1000), a random policy is devised, e.g. by randomly assigning values for parameters $\theta$ and storing them in parameter storage P. The controller 60 then controls physical system 10 by executing its control policy $\pi$ corresponding to these random parameters $\theta$. The corresponding state signals x are recorded and passed on to block 190.

Next (1010), a GP dynamics model $\hat{f}$ is trained using the recorded signals x and u to model the temporal evolution of the system state x, $x_{t+1} = \hat{f}(x_t, u_t)$.

Then (1020), a roll-out of the augmented system state $z_t$ over a horizon H is computed based on the GP dynamics model $\hat{f}$, the present parameters $\theta$ and the corresponding control policy $\pi(\theta)$ and the gradient of the cost function J w.r.t. to parameters $\theta$ is computed, e.g. by equations (17)-(20).

Based on these gradients, new parameters $\theta'$ are computed (1030). These new parameters $\theta'$ replace present parameters $\theta$ in parameter storage P.

Next, it is checked whether the parameters $\theta$ have converged sufficiently (1040). If it is decided that they have not, the method iterates back to step 1020. Otherwise, the present parameters $\theta$ are selected as optimum parameters $\theta^*$ that minimize the cost function J (1050).

Controller 60 is then executed with a control policy $\pi$ corresponding to these optimum parameters $\theta^*$ to control the physical system 10. The input signal u and the state signal x are recorded (1060).

The GP dynamics model $\hat{f}$ is then updated (1070) using the recorded signals x and u.

Next, it is checked whether the GP dynamics model $\hat{f}$ has sufficiently converged (1080). This convergence can be checked e.g. by checking the convergence of the log likelihood of the measured data x, t, which is maximized by adjusting the hyperparameters of the GP, e.g. with a gradient-based method. If it is deemed not to have been sufficiently converged, the method branches back to step 1020. Otherwise, the present optimum parameters $\theta^*$ are selected as parameters $\theta$ that will be used to parametrize the control policy $\pi$ of controller 60. This concludes the method.

Parts of this disclosure have been published as "Model-Based Policy Search for Automatic Tuning of Multivariate PID Controllers", arXiv:1703.02899v1, 2017, Andreas Doerr, Duy Nguyen-Tuong, Alonso Marco, Stefan Schaal, Sebastian Trimpe, which is incorporated herein by reference in its entirety.

What is claimed is:

1. A method for automatically tuning a multivariate PID controller for controlling a system, said method comprising:
configuring the multivariate PID controller with a random control policy for controlling the system, said random control policy having at least one parameter that characterizes said random control policy;
controlling the system with the multivariate PID controller based on said random control policy;
devising an optimum control policy for the multivariate PID controller for controlling the system by
optimizing said at least one parameter that characterizes said random control policy;
using a Gaussian process model to model expected dynamics of the system, wherein said optimization optimizes a cost function which depends on said random control policy and said Gaussian process model with respect to said at least one parameter; and
carrying out said optimization by evaluating at least one gradient of said cost function with respect to said at least one parameter to generate at least one optimized parameter of said optimum control policy,
wherein for an evaluation of said cost function a temporal evolution of a state of the system is computed using said random control policy and said Gaussian process model, and
wherein said cost function depends on an evaluation of an expectation value of a cost function under a probability density of an augmented state at time steps,
tuning the multivariate PID controller by changing said at least one parameter to said at least one optimized parameter; and
controlling the system with the tuned multivariate PID controller based on the optimum control policy.

2. The method according to claim 1, wherein said augmented state at a given time step comprises the state at said given time step.

3. The method according to claim 1, wherein said augmented state at a given time step comprises an error between the state and a desired state at a previous time step.

4. The method according to claim 1, wherein said augmented state at a given time step comprises an accumulated error of a previous time step.

5. The method according to claim 3, wherein the augmented state and/or the desired state are Gaussian random variables.

6. The method according to claim 1, further comprising:
devising said optimum control policy for the multivariate PID controller for controlling the system by
iteratively optimizing said at least one optimized parameter that characterizes said optimum control policy,
iteratively updating said Gaussian process model based on a recorded reaction of the system to said optimum control policy,
using said updated Gaussian process model to model expected dynamics of the system, wherein said optimization optimizes an updated cost function which depends on said optimized control policy and said updated Gaussian process model with respect to said at least one optimized parameter, and
carrying out said optimization by evaluating at least one gradient of the updated cost function with respect to said at least one optimized parameter to generate at least one further optimized parameter of the optimum control policy; and
iteratively tuning the multivariate PID controller by changing said at least optimized parameter to said at least one further optimized parameter.

7. The method according claim 1, wherein the system comprises an actuator and/or a robot.

8. The method according to claim 1, wherein a training system for devising said optimum control policy of the multivariate PID controller is configured to carry out the method.

9. The method according to claim 1, wherein a control system for controlling the system is configured to carry out the method.

10. The method according to claim 1, wherein a computer program contains instructions which cause a processor to carry out the method if the computer program is executed by said processor.

11. The method according to claim 10, wherein a machine-readable storage medium is configured to store the computer program.

12. The method according to claim 1, wherein said at least one gradient is determined by application of the chain rule to said cost function.

* * * * *